United States Patent
Nagashima et al.

(10) Patent No.: US 7,303,296 B2
(45) Date of Patent: Dec. 4, 2007

(54) VARIABLE-SHAPE MIRROR AND OPTICAL PICKUP DEVICE THEREWITH

(75) Inventors: Kenji Nagashima, Osaka (JP); Hitoshi Fujii, Osaka (JP); Fuminori Tanaka, Osaka (JP); Susumu Sugiyama, Shiga (JP); Akira Ishii, Shiga (JP); Katsuhiko Tanaka, Shiga (JP); Wataru Kuze, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/406,497

(22) Filed: Apr. 19, 2006

(65) Prior Publication Data

US 2006/0256456 A1 Nov. 16, 2006

(30) Foreign Application Priority Data

Apr. 19, 2005 (JP) ............................. 2005-121659

(51) Int. Cl.
*G02B 7/182* (2006.01)
(52) U.S. Cl. .................. 359/872; 359/224; 359/846
(58) Field of Classification Search ........ 359/223–226, 359/871, 872

See application file for complete search history.

(56) References Cited

U.S. PATENT DOCUMENTS 6,832,020 B2 * 12/2004 Okada et al. ................. 385/31

FOREIGN PATENT DOCUMENTS

| JP | A-2004-070004 | 3/2004 |
| JP | A-2004-347753 | 12/2004 |

* cited by examiner

*Primary Examiner*—Euncha P. Cherry
(74) *Attorney, Agent, or Firm*—Morgan, Lewis & Bockius LLP

(57) ABSTRACT

In a variable-shape mirror (1) of which the shape of the mirror surface can be varied, four piezoelectric elements (4) are sandwiched between a support base (2) and a mirror portion (3), and are arranged symmetrically in cross-shaped directions. The piezoelectric elements (4) are bonded to the mirror portion (3), and serve both to vary the shape of the mirror portion (3) by being driven and to fix the mirror portion (3) to the support base (2). Support portions (5) are arranged one inside each of the piezoelectric elements (4). With this structure, a small movement that the piezoelectric elements (4) produce when driven can be converted into a large movement of the mirror portion (3).

13 Claims, 5 Drawing Sheets

VARIABLE-SHAPE MIRROR AND OPTICAL PICKUP DEVICE THEREWITH

This application is based on Japanese Patent Application No. 2005-121659 filed on Apr. 19, 2005, the contents of which are hereby incorporated by reference.

BACKGROUND OF THE INVENTION

1. Field of the Invention

The present invention relates to a variable-shape mirror that permits the shape of a mirror surface thereof to be varied, and more particularly relates to the amount of shape variation of the mirror surface of a variable-shape mirror. The present invention also relates to an optical pickup device provided with a variable-shape mirror.

2. Description of Related Art

When information is read from or written to an optical disc such as a CD (compact disc) or DVD (digital versatile disc) by the use of an optical pickup device, the relationship between the optical axis of the optical pickup device and the disc surface should ideally be perpendicular. In reality, however, when the disc is rotating, their relationship does not always remain perpendicular. As a result, with an optical disc such as a CD or DVD, when its disc surface becomes inclined relative to the optical axis, the optical path of laser light is so bent as to produce coma aberration.

When coma aberration is produced, the spot of laser light shone on the optical disc deviates from the proper position, and, when the coma aberration becomes larger than permitted, inconveniently, it becomes impossible to accurately write or read information. For this reason, there have conventionally been proposed methods for correcting coma aberration as described above and other aberrations by the use of a variable-shape mirror.

For example, JP-A-2004-70004 proposes a method of reducing wavefront aberrations in a variable-shape mirror employing piezoelectric elements and having a unimorph or bimorph structure. The variable-shape mirror here has, for example, a structure as shown in FIGS. 6A, 6B, and 6C. FIG. 6A shows the variable-shape mirror with the mirror fitting member 108 thereof removed, as seen from the side opposite to the mirror material 101 thereof. FIG. 6B is a sectional view as cut along line A-A shown in FIG. 6A. FIG. 6C is a plan view as seen from the side of the mirror material 101. Reference numeral 102 represents piezoelectric elements, 103 represents wiring electrodes, 104 represents individual electrodes, 105 represents a mirror base, 106 represents a fixed-shape portion, 107 represents slits, and 109 represents a support portion.

In this structure, when, with the wiring electrodes 103 grounded, a positive voltage is applied to one of the individual electrodes 104 and a negative voltage to the other, one of the piezoelectric element 102 contracts and the other expands. Thus, the mirror surface becomes convex in the part thereof located on one side of the center thereof in the A-A direction and concave in the part thereof located on the other side. It is described that using this variable-shape mirror in an optical pickup device helps reduce wavefront aberrations. Moreover, JP-A-2004-70004 also proposes designing the support portion 109 of the variable-shape mirror structured as described above so that its shape can be elastically varied. This helps enhance the shape variation efficiency of the mirror portion. Here, the mirror portion denotes the part including the mirror material 101 and the mirror base 105. The support portion 109 denotes the part of the mirror portion located between the variable-shape part, which is the central part of the mirror portion including the part where the piezoelectric elements 102 are provided, and the fixed-shape portion 106, and thus denotes the part of the mirror portion that supports the variable-shape part with respect to the fixed-shape portion.

JP-A-2004-347753 also proposes an optical pickup device that can correct wavefront aberrations by the use of a variable-shape mirror. Here, it is proposed to provide an elastic plate diaphragm in the variable-shape mirror provided with a piezoelectric diaphragm and to give elasticity to part of the components. This helps realize a variable-shape mirror that offers a wide shape variation range with application of a low voltage.

In correcting aberrations with a variable-shape mirror, to achieve a given degree of aberration correction, the variable-shape mirror is required to be able to greatly vary the shape of the mirror portion thereof. In this respect, with the variable-shape mirrors disclosed in JP-A-2004-70004 and JP-A-2004-347753 mentioned above, although it is proposed to enhance the shape variation efficiency of the mirror portion for a given applied voltage, the amount of expansion and contraction of the piezoelectric elements themselves is so extremely small that enhancing the shape variation efficiency of the mirror portion for a given applied voltage does not much contribute to increasing the amount of shape variation of the mirror portion.

The amount of expansion and contraction of piezoelectric elements can be increased by laying piezoelectric elements in multiple layers, but there is almost no room for enlarging a variable-shape mirror incorporated in an optical pickup device. Thus, there have been demands for variable-shape mirrors that permit the amount of shape variation of the mirror portion thereof to be increased without increasing the external dimensions.

SUMMARY OF THE INVENTION

In view of the conventionally encountered inconveniences discussed above, it is an object of the present invention to provide a variable-shape mirror that can vary the shape of the mirror surface thereof wherein the amount of shape variation of the mirror portion thereof can be increased with no increase in the external dimensions thereof. It is another object of the present invention to provide an optical pickup device that employs a variable-shape mirror with an increased amount of shape variation of the mirror portion thereof and that can thus correct aberrations in a wide range.

To achieve the above objects, according to one aspect of the present invention, a variable-shape mirror is provided with: a support base; a mirror portion that is disposed to face the support base and that has a mirror surface on the side thereof facing away from the support base; an even number of piezoelectric elements that are sandwiched between the support base and the mirror portion and that vary the shape of the mirror surface, the piezoelectric elements being bonded to the mirror portion in outer peripheral parts of the mirror portion, the piezoelectric elements being arranged on the support base such that, of the piezoelectric elements, every two located opposite to each other across a part of the mirror surface where the amount of shape variation thereof is maximal are symmetrically arranged; and support portions that are provided one inside each of the piezoelectric elements and that are arranged on the support base so as to make contact with the mirror portion.

With this structure, in the variable-shape mirror that can vary the shape of the mirror surface thereof, the support portions are provided one inside each of the piezoelectric elements symmetrically arranged. Thus, on the principle of a lever, with no increase in the external dimensions, a small amount of shape variation produced by the piezoelectric elements can be converted into a large displacement of the mirror portion, and hence a large amount of shape variation of the mirror surface. Moreover, the piezoelectric elements also serve to fix the mirror portion and the support base together. This eliminates the need to provide separate fixing parts.

According to the present invention, in the variable-shape mirror structured as described above, the support portions may be located close to the piezoelectric elements.

With this structure, since the support portions are located close to the piezoelectric elements, while the distance between the support portions, which serve as a fulcrum, and the piezoelectric elements is short, the distance between the support portions and the middle point between the symmetrically arranged piezoelectric elements is long. This helps increase the amount of shape variation of the mirror portion.

According to the present invention, in the variable-shape mirror structured as described above, the outer peripheral parts may be located at an edge of the mirror portion.

With this structure, since the piezoelectric elements are arranged at the edge of the mirror portion, the distance between the support portions and the middle point between the symmetrically arranged piezoelectric elements is longer. This helps further increase the amount of shape variation of the mirror portion.

According to the present invention, in the variable-shape mirror structured as described above, four of the piezoelectric elements may be arranged symmetrically in cross-shaped directions.

With this structure, since four piezoelectric elements are provided symmetrically, the shape of the mirror surface can be varied in a well-balanced fashion.

According to another aspect of the present invention, an optical pickup device is provided with the variable-shape mirror structured as described above.

With this structure, it is possible to increase the amount of shape variation of the mirror portion of the variable-shape mirror. Thus, it is possible to correct aberrations in a wide range.

DETAILED DESCRIPTION OF PREFERRED EMBODIMENTS

Figure 1A:
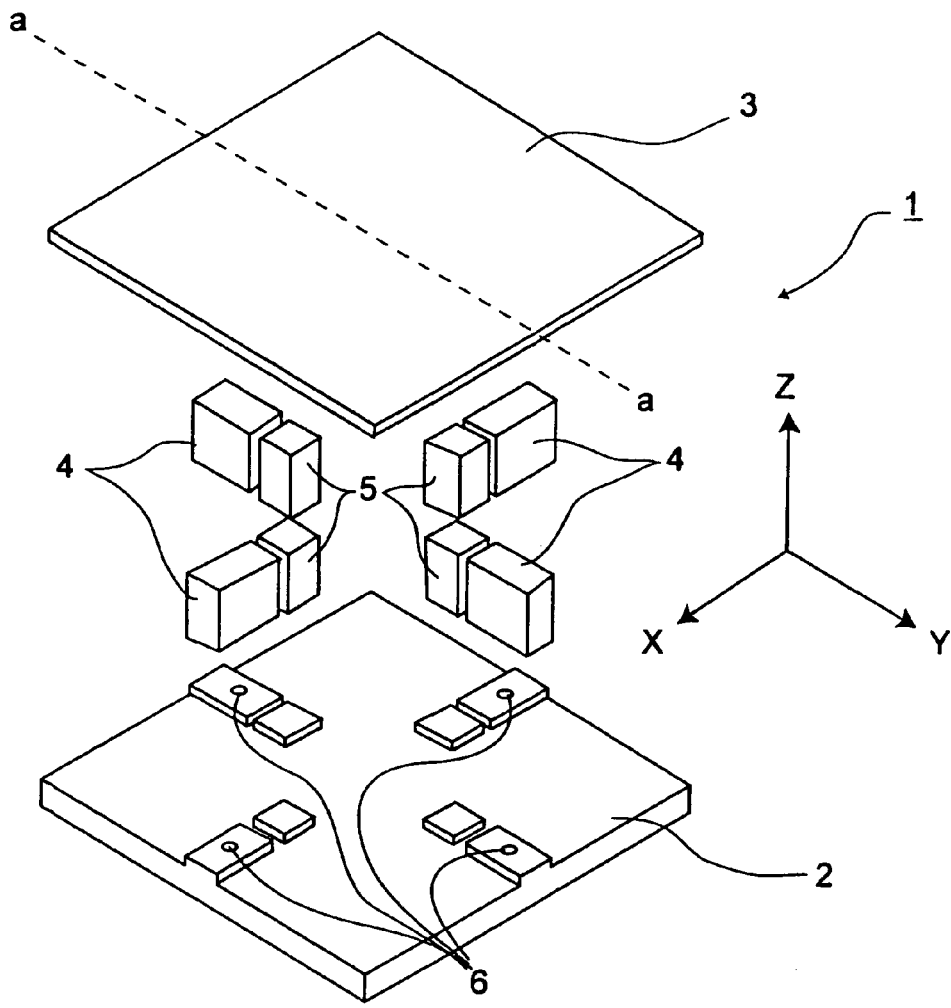
FIG. 1A is a diagram showing the structure of a variable-shape mirror as an embodiment of the present invention, showing the components thereof in an exploded perspective view.

Hereinafter, embodiments of the present invention will be described with reference to the accompanying drawings. It should be understood that the embodiments described below are merely examples, and are therefore not meant to limit in any way the manner in which the present invention can be carried. It should also be understood that, in the drawings, the sizes and thicknesses of the components, the amount of shape variation that occurs when the shape is varied, etc. are exaggerated for the purpose of easy understanding, and therefore these dimensions are different from those actually observed.

Figure 1B:
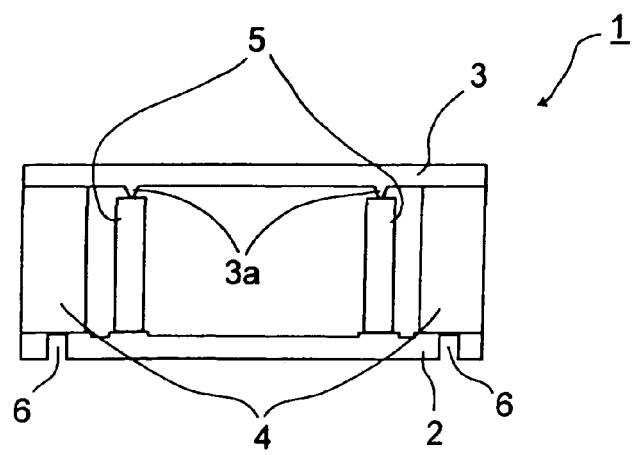
FIG. 1B is a sectional view of the variable-shape mirror of the embodiment, as cut along line a-a shown in FIG. 1A.

FIG. 1A is a diagram showing the structure of a variable-shape mirror as an embodiment of the present invention, showing the components thereof in an exploded perspective view. FIG. 1B is a sectional view cut along line a-a shown in FIG. 1A.

Reference numeral 1 represents a variable-shape mirror according to the present invention, which is built as an aberration correcting mirror that varies the shape of the mirror surface of the mirror portion 3 thereof by exploiting the vertical displacement of piezoelectric elements 4. Reference numeral 2 represents a support base on which piezoelectric elements 4 and support portions 5 are fitted. The support base 2 is formed of, for example, an insulating material such as ceramic or glass. The support base 2 has electrode holes 6 formed therein through which a voltage is fed to the piezoelectric elements 4.

The shape of the mirror surface of the mirror portion 3 is varied by the piezoelectric elements 4, and the mirror portion 3 reflects a light beam emitted from a light source. The mirror portion 3 is formed of, preferably, a material that is rigid and that is electrically conductive so as to be able to feed a voltage to the piezoelectric elements 4. Examples of such a material include silicon and metals such as aluminum and iron. The mirror portion 3 may be formed of an insulating material such as glass, though it then does not offer electrical conductivity. In a case where the mirror portion 3 is formed of an insulating material such as glass, to achieve electrical conduction to the piezoelectric elements 4, it is necessary to form, on the side of the mirror portion 3 opposite to the mirror surface thereof, an electrode pattern by vapor-depositing gold or the like, or to fit an electrode to the side of the mirror portion 3 opposite to the mirror surface thereof.

The mirror portion 3 may be formed of a single material. Alternatively, it is also possible to form a base portion of the mirror portion 3 with silicon and then coat the top side thereof by laying a coating of aluminum or the like to form a mirror surface. It is also possible to form a plurality of layers on the base portion.

For example as shown in FIG. 1B, the mirror portion 3 has, on the lower side thereof, projections 3a formed in the parts where the mirror portion 3 makes contact with the support portions 5. Although it is not absolutely necessary to provide these projections 3a, but, since it is preferable to reduce the contact area between the mirror portion 3 and the support portions 5, it is preferable to form projections 3a either on the mirror portion 3 as in this embodiment or on the top faces of the support portions 5. In either case, the projections may be given any shape other than in this embodiment within the objects of the present invention.

For example, in a case where the mirror portion 3 is formed of silicon, the projections 3a can be formed thereon by dry etching. The projections 3a may be formed by any process other than dry etching.

As shown in FIG. 1A, the piezoelectric elements 4 are sandwiched between the support base 2 and the mirror portion 3, and four of them are arranged symmetrically in cross-shaped directions. Moreover, for example as shown in FIG. 1B, the piezoelectric elements 4 are connected to individual electrodes (unillustrated) through the electrode holes 6 formed at the bottom faces of the piezoelectric elements 4. On the other hand, the piezoelectric elements 4 are, at the top faces thereof, bonded to the mirror portion 3. This permits the piezoelectric elements 4 to expand and contract. In a case where, as described above, the mirror portion 3 is formed of an insulating material, an electrode layer is vapor-deposited on the lower side thereof to provide an electrode on the mirror portion 3, and this electrode is used as a common electrode.

Since the piezoelectric elements 4 are bonded to the mirror portion 3, the piezoelectric elements 4 serve both to vary the shape of the mirror portion 3 by being driven and to fix the mirror portion 3 to the support base 2. Thus, it is preferable that the piezoelectric elements 4 be given an equal height so as to fix the mirror portion 3 at an equal height.

The piezoelectric elements 4 are formed of a piezoelectric ceramic such as PZT (lead zirconate titanate, $Pb(Zr_xTi_{1-x})$) or a piezoelectric polymer such as polyvinylidene fluoride. Among these, a piezoelectric ceramic material is preferable for its high mechanical strength.

In this embodiment, the piezoelectric elements 4 are rectangular-column-shaped; these, however, may be given any other shape, for example circular-columnar. There may be provided any number of piezoelectric elements 4 in any arrangement other than specifically described in this embodiment. However, to permit the piezoelectric elements 4, in combination with the support portions 5, to increase the amount of shape variation of the mirror portion 3 on the principle of a lever, the piezoelectric elements 4 need to be arranged symmetrically, and there need to be provided an even number of them. However, from the viewpoint of the size of the variable-shape mirror 1 and other factors, it is disadvantageous to provide an unnecessarily large number of piezoelectric elements 4; moreover, the mirror surface of the mirror portion 3 needs to be prevented from local deformation. Out of these considerations, it is preferable that, as in this embodiment, four piezoelectric elements 4 be arranged symmetrically in cross-shaped directions. Moreover, to more properly vary the shape of the mirror surface, it is preferable that the piezoelectric elements 4 be arranged symmetrically in cross-shaped directions about an axis passing through the center of the mirror surface of the mirror portion 3 as seen in a plan view.

As shown in FIGS. 1A and 1B, the support portions 5 are sandwiched between the support base 2 and the mirror portion 3, and are disposed inside the piezoelectric elements 4 arranged symmetrically in cross-shaped directions. The top faces of the support portions 5 make contact with the projections 3a of the mirror portion 3. It is not absolutely necessary to bond the projections 3a and the support portions 5 together. Leaving the projections 3a and the support portions 5 unbonded is preferable in that the mirror surface is then prevented from local deformation when the shape of the mirror portion 3 is varied by driving the piezoelectric elements 4.

In this embodiment, the support portions 5 are separate from the support base 2. Alternatively, the support base 2 and the support portions 5 may be formed integrally, or may be modified in shape and other aspects within the objects of the present invention. To prevent deformation on the mirror surface of the mirror portion 3, it is preferable that the support portions 5 be given an equal height. It is also preferable that the relationship between the height of the support portions 5 and that of the piezoelectric elements 4 be adjusted so as not to produce deformation.

In this embodiment, as shown in FIGS. 1A and 1B, the variable-shape mirror 1 as a whole is given the shape of a rectangular parallelepiped; its shape, however, is not limited to this particular shape, but may be modified within the objects of the present invention. For example, the support base 2, the mirror portion 3, or any other components may be formed circular, and the support base 2 may be formed larger than the mirror portion 3.

Figure 2A:
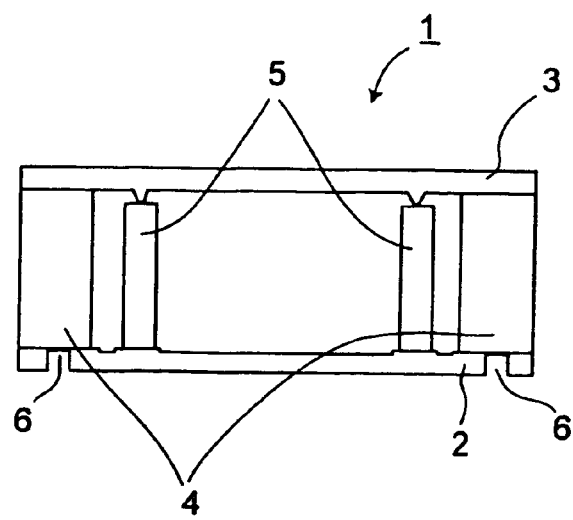
FIG. 2A is a sectional view of the variable-shape mirror of the embodiment, as cut along line a-a shown in FIG. 1A, illustrating the operation of the variable-shape mirror.
Figure 2B:
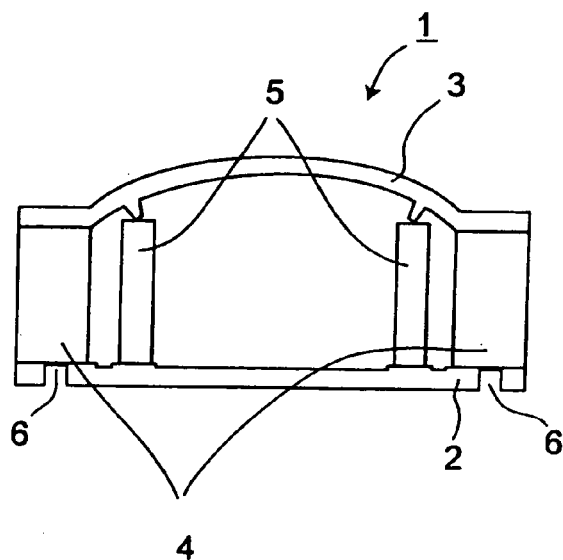
FIG. 2B is a sectional view of the variable-shape mirror of the embodiment, as cut along line a-a shown in FIG. 1A, illustrating the operation of the variable-shape mirror.
Figure 2C:
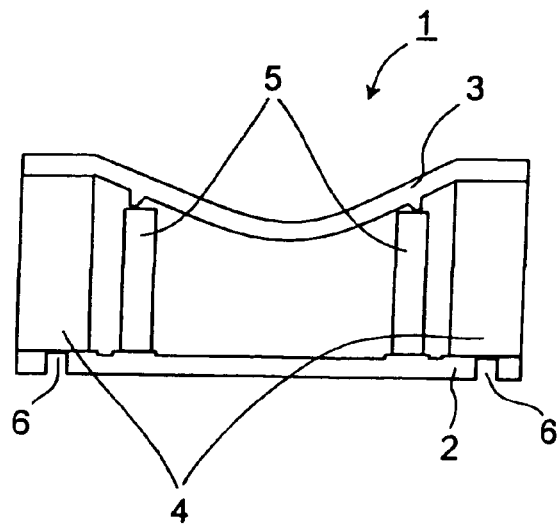
FIG. 2C is a sectional view of the variable-shape mirror of the embodiment, as cut along line a-a shown in FIG. 1A, illustrating the operation of the variable-shape mirror.

Now, the operation of the variable-shape mirror 1 structured as described above will be described with reference to FIGS. 2A, 2B, and 2C. For example, as the piezoelectric elements 4 are driven, the variable-shape mirror 1 varies the shape thereof as shown in FIGS. 2A to 2C. FIGS. 2A to 2C are sectional views of the variable-shape mirror 1 as cut along line a-a shown in FIG. 1A.

FIG. 2A shows a state in which no voltage is applied to the piezoelectric elements 4. When a voltage is applied to the piezoelectric elements 4, they expand or contract. FIG. 2B shows a state in which the left-hand and right-hand piezoelectric elements 4 have contracted. When the piezoelectric elements 4 contract, the parts of the mirror portion 3 where it is fixed to the piezoelectric elements 4 are pulled down, and the other parts are raised by the presence of the support portions 5. Thus, the mirror portion 3 become convex. On the other hand, FIG. 2C shows a state in which the left-hand and right-hand piezoelectric elements 4 have expanded. When the piezoelectric elements 4 expand, the mirror portion 3, which is bonded to the support portions 5, is pulled by the support portions 5 to become concave-surfaced. How the individual piezoelectric elements 4 expand or contract may be combined in any way other than specifically described here. For example, in FIGS. 2A to 2C, one of the left-side and right-side piezoelectric elements 4 may be made to expand while the other is made to contract.

Figure 4:
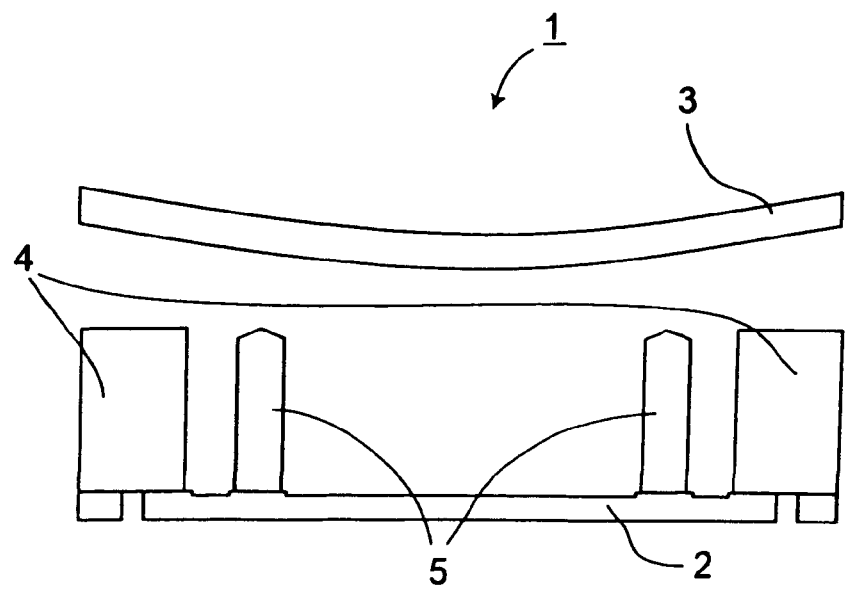
FIG. 4 is a diagram showing a modified example of a variable-shape mirror according to the present invention.

In this embodiment, as described previously, the support portions 5 and the mirror portion 3 may or may not be bonded together. In a case where they are not bonded together, when the left-hand and right-hand piezoelectric elements 4 expand, the mirror portion 3 is simply raised upward, and does not change its shape as shown in FIG. 2C. In this case, therefore, it is advisable, for example, that the mirror portion 3 be given a previously concave shape as shown in FIG. 4. With this shape, when the piezoelectric elements 4 expand, the mirror portion 3 tends to restore its original concave shape and thus changes its shape. In this way, the shape of the mirror portion 3 can be varied not only when the piezoelectric elements 4 contract but also when they expand. This makes it possible to obtain a sufficient amount of shape variation in the mirror portion 3.

FIG. 4 shows the variable-shape mirror 1 in its state similar to that shown in a sectional view as cut along line a-a shown in FIG. 1A, and shows the mirror portion 3 in its state before it is fixed to the piezoelectric elements 4. In a case where the mirror portion 3 and the piezoelectric elements 4 are fixed together, when the piezoelectric elements 4 are not driven, the mirror portion 3 is raised by the support portions 5 to become, for example, flat-plate-shaped. Incidentally, a concave-surfaced mirror portion 3 can be formed, for example, by laying together two or more layers with materials with increasingly high thermal contraction coefficients from bottom to top. Specifically, for example, the base portion is formed of silicon, and then, at a high temperature, aluminum is vapor-deposited or otherwise the mirror-surface portion is formed. When these are cooled down, since aluminum has a higher thermal contraction coefficient, a concave-surfaced mirror is obtained.

Figure 3:
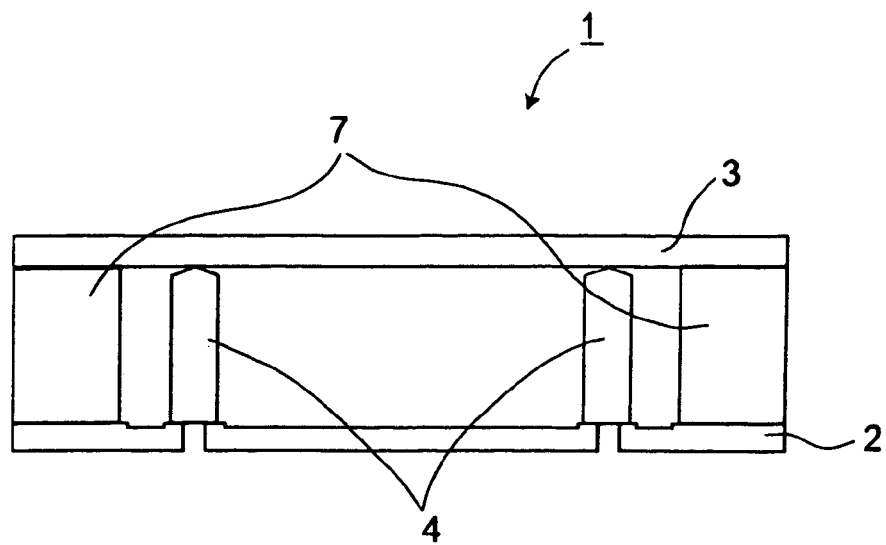
FIG. 3 is a sectional view of a variable-shape mirror, taken up for comparison with the variable-shape mirror of the embodiment.

A structure where, as in this embodiment, the piezoelectric elements 4, which act as a point of force application, are arranged outside the support portions 5, which act as a fulcrum, as compared with a construction where, as shown in FIG. 3, the piezoelectric elements 4 are arranged inside the fixed portions 7 to which the mirror portion 3 is fixed, is more suitable to convert, on the principle of a lever, a small movement of the piezoelectric elements 4 into a large movement of the mirror portion 3. Thus, for example, when the left-side and right-side piezoelectric elements 4 both contract as shown in FIG. 2B, although the amount of contraction of the piezoelectric elements 4 is small, it is possible to obtain a large amount of shape variation in the central portion of the mirror portion 3. That is, with a construction according to the present invention, it is possible to increase the amount of shape variation of the mirror portion 3 without increasing the external dimensions of the variable-shape mirror 1.

In this embodiment, the principle of a lever is exploited to convert a small shape variation in the piezoelectric elements 4 into a large shape variation in the mirror portion 3. Accordingly, it is preferable that the support portions 5 and the piezoelectric elements 4 be arranged close to each other. It is further preferable that the piezoelectric elements 4 thus arranged close to the support portions 5 be arranged at the edge of the mirror portion 3. This helps increase the distance between the center of the mirror portion 3, at which the shape variation is largest in the mirror portion 3, and the support portions 5, which act as a fulcrum, and thus helps further increase the amount of shape variation of the mirror portion 3.

Figure 5:
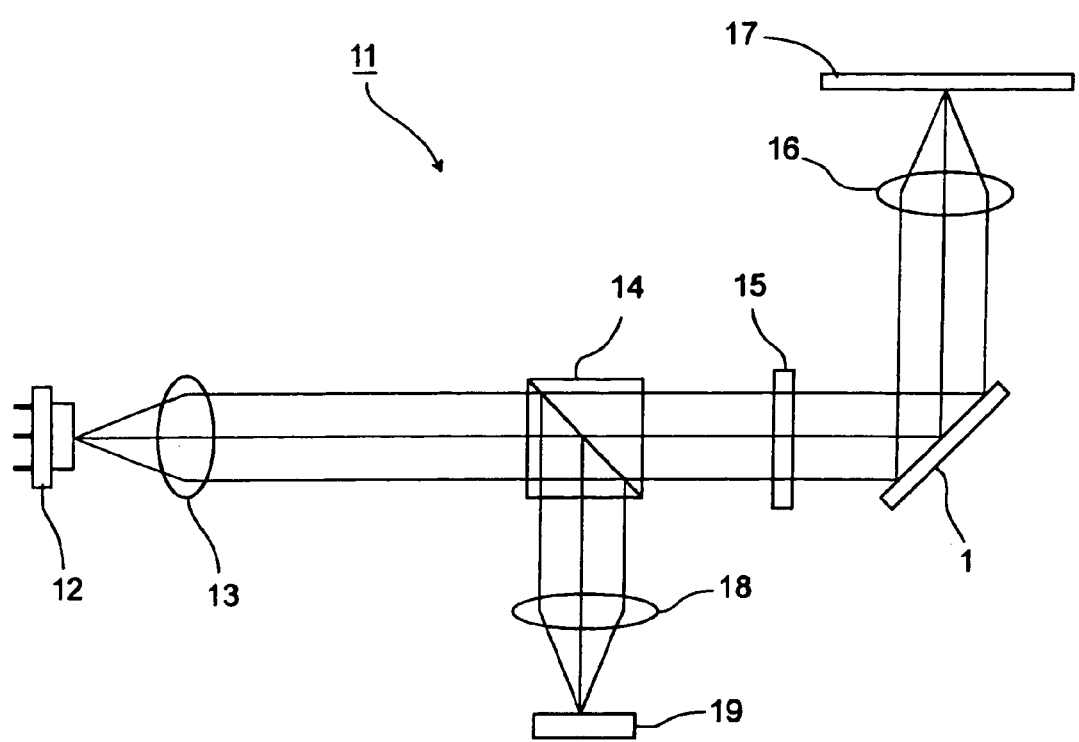
FIG. 5 is a diagram showing an outline of the optical system of an optical pickup device employing a variable-shape mirror according to the present invention.
Figure 6A:
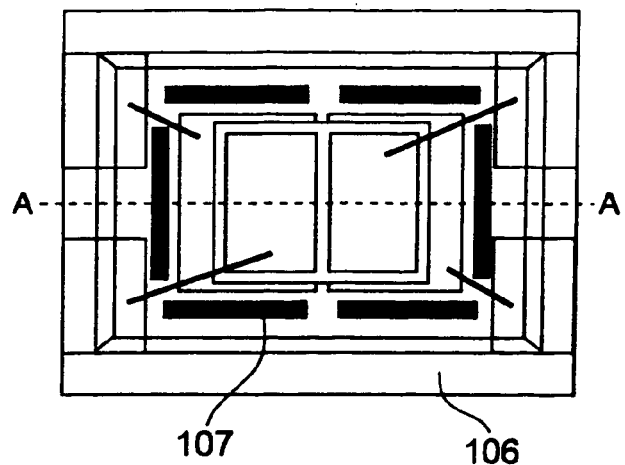
FIG. 6A is a diagram showing the structure of a conventional variable-shape mirror, with the mirror fitting member thereof removed, as seen from the side opposite to the mirror material thereof.
Figure 6B:
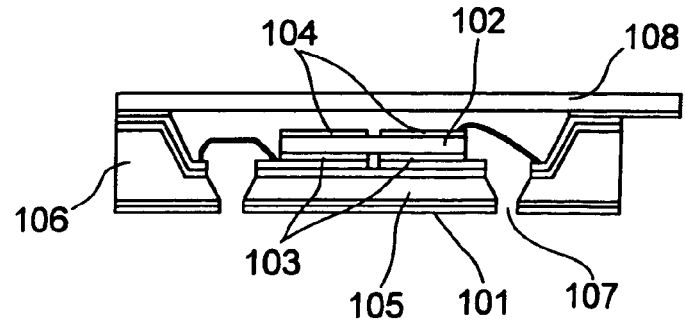
FIG. 6B is a diagram showing the structure of the conventional variable-shape mirror, in a sectional view thereof as cut along line A-A shown in FIG. 6A.
Figure 6C:
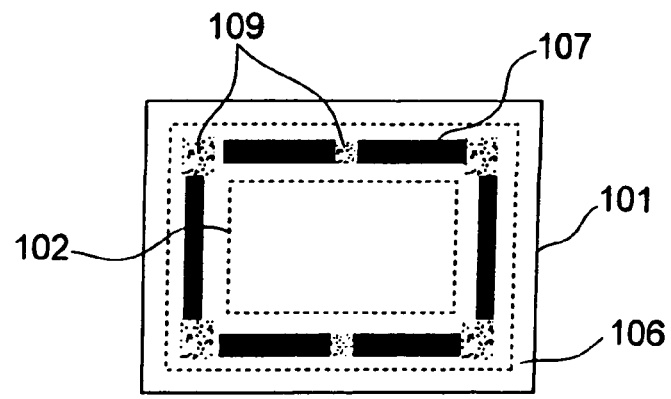
FIG. 6C is a diagram showing the structure of the conventional variable-shape mirror, in a plan view as seen from the side of the mirror material.

Next, as another embodiment of the present invention, an optical pickup device 11 employing a variable-shape mirror according to the present invention will be described. The optical pickup device 11 incorporating the variable-shape mirror 1 according to the present invention includes an optical system constructed, for example, as shown in FIG. 5. The optical system of the optical pickup device 11 may be constructed in any other manner within the objects of the present invention.

The variable-shape mirror 1 shown in FIG. 5 is provided with a semiconductor laser 12, a collimator lens 13, a beam splitter 14, a variable-shape mirror 1 according to the present invention, a quarter-wave plate 15, an objective lens 16, a condenser lens 18, and a photodetector 19.

The laser light emitted from the semiconductor laser 12 is converted into a parallel beam by the collimator lens 13. This parallel beam is transmitted through the beam splitter 14, then has its polarization state changed by the quarter-wave plate 15, is then reflected on the variable-shape mirror 1, and is then condensed by the objective lens 16 to be focused on an optical disc 17. The laser light reflected from the optical disc 17 passes through the objective lens 16, is then reflected on the variable-shape mirror 1, then passes through the quarter-wave plate 15, is then reflected by the beam splitter 14, and is then condensed by the condenser lens 18 to be directed to the photodetector 19.

In this embodiment, the variable-shape mirror 1 functions, on one hand, as a conventionally used raising mirror. On the other hand, in this optical system, for example, when the optical disc 17 becomes inclined relative to the optical axis of the laser light, as described earlier, coma aberration is produced. To correct this coma aberration, the shape of the mirror surface of the variable-shape mirror 1 is varied; that is, the variable-shape mirror 1 also serves to correct aberrations. Specifically, based on the signal obtained from the photodetector 19, when correction of wavefront aberrations such as coma aberration is necessary, a controller (unillustrated) provided in the optical pickup device 11 feeds a signal to the variable-shape mirror 1 to instruct it to vary the shape of the mirror portion 3 so as to correct the aberrations. The variable-shape mirror 1 according to the present invention is ingeniously structured to obtain a large amount of shape variation in the mirror portion 3, and thus permits aberration correction in a wide range.

According to the present invention, in a variable-shape mirror that can vary the shape of the mirror surface thereof, through appropriate arrangement of the piezoelectric elements and through the introduction of support portions, it is possible, without increasing the external dimensions of the variable-shape mirror used in an optical pickup device, to increase the amount of shape variation of the mirror surface.

An optical pickup device employing a variable-shape mirror according to the present invention offers an increased amount of shape variation in the mirror surface of the variable-shape mirror, and thus permits aberration correction in a wide range.

What is claimed is:

1. A variable-shape mirror comprising:
    a support base;
    a mirror portion that is disposed to face the support base and that has a mirror surface on a side thereof facing away from the support base;
    an even number of piezoelectric elements that are sandwiched between the support base and the mirror portion and that vary a shape of the mirror surface, the piezoelectric elements being bonded directly to the mirror portion in outer peripheral parts of the mirror portion, the piezoelectric elements being arranged on the support base such that, of the piezoelectric elements, every two located opposite to each other across a part of the mirror surface where an amount of shape variation thereof is maximal are symmetrically arranged; and
    support portions each having one end thereof that makes contact with the mirror portion and other end thereof that is placed next to each of the piezoelectric elements as a pair on a support base,
    wherein each of the piezoelectric elements is placed closer to a peripheral side of the support base than each of the support potions with which said each of the piezoelectric elements makes a pair is placed.

2. The variable-shape mirror of claim 1,
    wherein the support portions are located close to the piezoelectric elements.

3. The variable-shape mirror of claim 1, wherein four of the piezoelectric elements are arranged symmetrically in cross-shaped directions.

4. The variable-shape mirror of claim 2, wherein the outer peripheral parts are located at an edge of the mirror portion.

5. The variable-shape mirror of claim 2, wherein four of the piezoelectric elements are arranged symmetrically in cross-shaped directions.

6. The variable-shape mirror of claim 4, wherein four of the piezoelectric elements are arranged symmetrically in cross-shaped directions.

7. An optical pickup device comprising the variable-shape mirror of claim 1.

8. An optical pickup device comprising the variable-shape mirror of claim 2.

9. An optical pickup device comprising the variable-shape mirror of claim 3.

10. An optical pickup device comprising the variable-shape mirror of claim 4.

11. An optical pickup device comprising the variable-shape mirror of claim 5.

12. An optical pickup device comprising the variable-shape mirror of claim 6.

13. The variable-shape mirror of claim 1, wherein, a voltage for driving the piezoelectric elements is applied through a common electrode provided to the mirror portion as an electrode common to all of the piezoelectric elements and through the support base.

* * * * *